Jan. 29, 1957  E. W. HAGADORN  2,779,853
ELECTRICALLY HEATED TOOL
Filed June 29, 1954
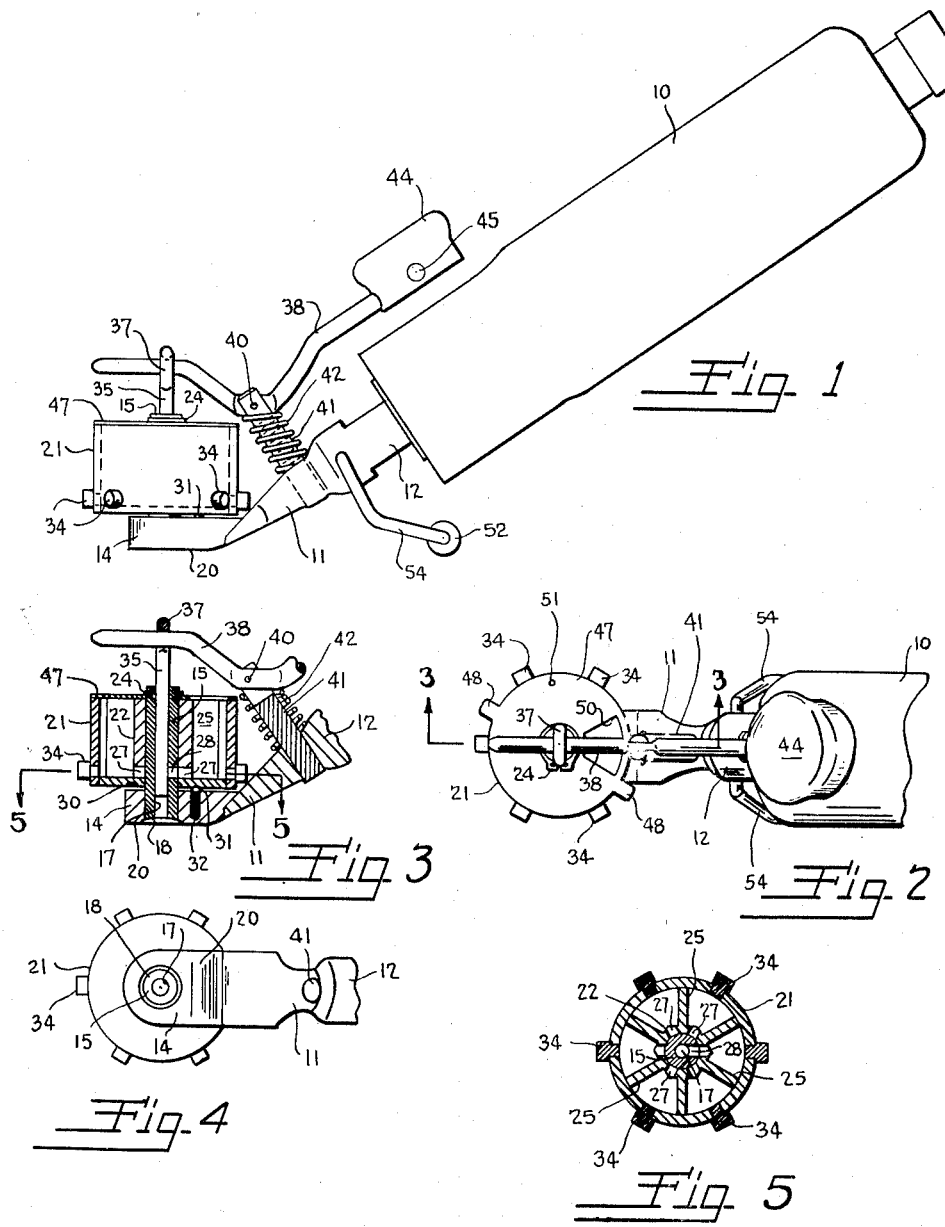
INVENTOR.
ELMORE W. HAGADORN
BY
Richard von K. Bruns
Attorney

United States Patent Office 2,779,853
Patented Jan. 29, 1957

2,779,853

ELECTRICALLY HEATED TOOL

Elmore W. Hagadorn, Solvay, N. Y., assignor to Finishine Laboratories, Inc., Syracuse, N. Y., a corporation of New York Application June 29, 1954, Serial No. 440,040

10 Claims. (Cl. 219—27)

This invention relates to electrically heated tools, and has particular reference to a novel electrically heated tool of the type known as a burning-in iron or burning-in knife. Burning-in knives are ordinarily employed in connection with furniture or woodwork repair and refinishing, and are used to heat resinous materials and work them into gouges or cracks in the surface of the wood.

Professional furniture repairment and refinishers generally prefer to repair holes, gouges and other mars in fine furniture with resinous materials since such materials form an excellent bond with the wood and blend well with the final finish. These materials are usually supplied in the form of solid sticks, commonly called burning-in sticks. Various types of burning-in sticks are available, such as shellac sticks for use with shellac finishes, lacquer sticks for use with lacquer finishes, varnish sticks for use with varnish finishes, and so forth. Each type of stick is also available in a number of different color shades and hues to facilitate matching the burn-in, or resin fill, with the color of an existing finish.

Heretofore, the burning-in operation has always been accomplished by applying a heated tool to one end of the burning-in stick, the tool serving to melt a small amount of the stick material and transfer it to the hole or gouge to be filled. Thereafter, the tool is used to work the heated material into the wood so that a strong bond is formed therewith. Originally, the tool used was a palette knife or the like, heated over an open flame, and this method is still widely used today. The use of an open flame to heat the palette knife, however, creates a definite fire hazard, and this disadvantage is made more serious by the fact that inflammable materials are always present in a cabinet-making or refinishing shop. Another serious disadvantage of the palette knife method of burning-in is that there is no accurate way to regulate the temperature of the knife, and if the latter becomes overheated it can scorch the finish surrounding the area being repaired and cause decomposition of the resinous burning-in material. In addition, the knife blade has a tendency to collect soot from the flame which introduces undesirable discoloration in light-colored burning-in materials.

The development of an electrically heated burning-in iron or knife eliminated most of the above-noted disadvantages of the palette knife. An example of such a device is shown in U. S. Patent No. 2,427,209, issued to the present applicant on September 9, 1947. This patent discloses an electrically heated burning-in knife having a temperature regulated heating element and air cooled handle. The use of an electrical heating element, of course, eliminates to a large degree the danger of fire, while regulation of the temperature prevents overheating of the blade.

The present invention represents a substantial improvement over the applicant's prior invention by providing means on the work head of the tool to hold a supply of burning-in materials, which materials are heated by the heating element of the tool and selectively fed in measured amounts to the underside of the blade. To this end, a turret member may be rotatably mounted on the upper side of the blade, the turret having a plurality of compartments adapted to contain resinous burning-in materials of various colors or shades. These compartments may be selectively connected with a central passage leading to the underside of the blade and controlled by a valve element so that measured amounts of a selected material can be delivered to the bottom or working surface of the blade.

The arrangement briefly described above permits faster and more economical burning-in than has been possible heretofore by means of any of the devices or methods of the prior art. Thus, more burning-in operations can be carried out within a given period of time because it is only necessary to actuate the valve element with one finger in order to deliver the burning-in material to the work surface of the blade, directly over the hole or scratch to be filled. With prior methods, on the other hand, each operation involves picking up the burning-in stick, applying the tool to the stick to melt off sufficient material to work with, and transferring the material by means of the tool to the work area needing repair. The arrangement of the invention is also more economical to use than prior devices because, by permitting close control over the amount of burning-in material delivered to the blade work surface, it avoids wasting the material. The resinous materials are relatively expensive, and the conventional method of melting off a portion of the burning-in stick with the heated tool frequently results in considerable waste since the amount of material being melted off can not be accurately controlled. This same inaccurate control also results, in many instances, in an excess deposit of burning-in material which excess must be abrasively removed with a resultant increase in time and labor. In addition to the above-mentioned efficiency advantages of the invention, the device provided thereby also permits in the easiest possible manner such operations as shading the color of the burning-in material in building up the fill in a deep hole or gouge and applying contrasting color in the last step to achieve a natural wood grain effect.

With the foregoing and other considerations in view, it is a primary object of the present invention to provide an electrically heated burning-in tool which is safe, efficient and economical in operation.

Another important object of the invention is to provide an electrically heated burning-in tool wherein a supply of the burning-in material may be contained in the tool and heated by the heating element thereof.

A further important object of the invention is to provide an electrically heated burning-in tool wherein burning-in material contained in the tool may be delivered in controlled amounts directly to the working surface of the tool blade.

A still further important object of the invention is to provide an electrically heated burning-in tool having means adapted to selectively deliver a plurality of different colors or shades of burning-in material to the working surface of the tool blade.

Another object of the invention is to provide an electrically heated burning-in tool which contains its own supply of burning-in materials and yet can perform burning-in operations on vertical as well as horizontal, and curved as well as plane, surfaces.

Still another object of the invention is to provide an electrically heated burning-in tool which is compact and simple to operate.

A further object of the invention is to provide an electrically heated burning-in tool which is constructed and arranged to give a long life of service under all operating conditions.

Other objects and advantages will become apparent from the following detailed description read in conjunction with the accompanying drawings wherein like reference numbers represent corresponding parts in all the views.

In the drawings:

Figure 1 is a side elevation of an electrically heated burning-in tool embodying the invention;

Figure 2 is a fragmentary top plan view of the burning-in tool of Figure 1;

Figure 3 is a fragmentary vertical section through the tool taken along line 3—3 of Figure 2;

Figure 4 is a fragmentary bottom plan view of the burning-in tool of Figure 1; and Figure 5 is a horizontal section through the turret member of the tool taken along line 5—5 of Figure 3.

Having reference now to the drawings, which illustrate a typical embodiment of the invention for the purpose of disclosure, 10 indicates an insulated, air-cooled handle and 11 generally indicates a work head which may be threaded into or otherwise detachably secured to the handle. Handle 10 encloses the necessary electric heating elements for heating the work head 11 and is provided with a suitable electric cord and switch, not shown. The details of the heating elements and handle construction play no part in this invention, and for a complete disclosure thereof reference may be had to Patent No. 2,427,209 cited above.

The work head 11 includes a shank 12 and a blade 14, the latter being obliquely disposed with respect to the axis of the shank and tool handle as shown. Blade 14 is preferably formed of copper, while most of the remaining parts of the work head are preferably formed of half hard brass. A hollow post 15 extends through the blade 14 and projects upwardly from the upper side thereof at right angles to the plane of the blade. The central passage 17 through the post communicates at its lower end with a substantially cylindrical indentation 18 in the bottom or work surface 20 of the blade, the indentation being provided for a purpose to be explained hereinafter.

A cylindrical turret member 21 is rotatably mounted on post 15 by means of a centrally disposed hollow post 22 fixed to the bottom of the turret. Turret 21 is open at the top and is detachably secured in position with a conventional snap-on retaining ring 24. A plurality of radially disposed ribs or walls 25, Figure 5, divide the turret into individual compartments, six such compartments being shown in the illustrated embodiment. These compartments are adapted to receive the resinous burning-in materials, and each is formed with an outlet passage 27 extending radially through the central turret post 22. The hollow post 15 is formed with a single radial passage 28 whose axis is preferably coplanar with the axes of the outlet passages 27, but may also be angled downwardly from the passages 27 towards the lower end of the axial post passage 17 if desired. The passage 28 is located on the back side of the post 15, facing the tool handle, and if the turret 21 is rotated upon the post each of the outlet passages 27 will successively come into registry with the passage 28.

In order to releasably hold the outlet passage 27 of a selected compartment in registration with the passage 28, a plurality of circumferentially arranged hemispherical indentations 30 are formed in the bottom of the turret, each indentation being in radial alignment with one of the outlet passages 27. As the outlet passage is brought into registration with the passage 28, a spring biased ball or detent 31 enters the indentation corresponding with the outlet passage to hold the passages in communicating position. The ball 31 and its spring 32 operate in a bore in the blade 14, the bore being in radial alignment with the rearwardly facing passage 28. A plurality of lugs 34 project outwardly from the lower periphery of the turret side wall, each lug being in radial alignment with one of the outlet passages 27 and its corresponding indentation 30. These lugs serve as external indications as to the radial position of the passages 27 and also provide means whereby the turret, which is too hot to touch while the tool is in operation, may be rotated. Thus, the turret may be rotated on the post 15 by pushing against a lug 34 with a screw driver or other handy tool, or the lugs may be brought to bear against a vertical surface to hold the turret while the tool handle is turned to accomplish the desired relative rotation.

Slidably mounted in the axial passage 17 of post 15 is a valve pin 35 which is formed into a loop 37 at its upper end. The forward end of a valve actuating lever 38 passes through the loop 37, the lever being pivoted at 40 on a post 41 fixed to the shank 12 of the work head. Surrounding the post 41 is a compression spring 42 which tends to rotate the lever 38 in a counter clockwise direction, Figures 1 and 3, so that the end of the pin 35 extends below the passage 28 and thus prevents material in a selected compartment from flowing into the axial passage 17 and down to the indentation 18 in the underside of the blade. The rear end of the valve actuating lever terminates adjacent the tool handle 10 and is provided with a finger key 44 having a plurality of air cooling passages 45 therethrough. The key 44 is mounted for limited rotation on the end of the lever so that it can be adjusted for convenient operation by the thumb or forefinger of either a right-handed or left-handed person holding the tool handle.

A cover member 47 is rotatably mounted on the post 15, independent of the turret 21, between the upper edge of the turret and collar 24. The purpose of this cover is to prevent melted materials in the turret compartments from spilling out when the tool is performing burning-in operations on oblique or vertical surfaces. Tab elements 48 project diametrically from the cover to facilitate turning it, and an opening 50 having substantially the same shape as that of the cross section of a turret compartment is provided to permit successive loading of the compartments with the resinous burning-in materials and thereafter to enable the operator to determine which color or shade of material is in each compartment. A vent hole 51 is bored in the cover to permit free flow of material from any selected compartment.

The operation of the device is as follows. The turret compartments are filled with chunks or chips of burning-in sticks of the desired colors or shades of colors, and the heating element is put into operation to heat the work head and materials in the compartments. When the burning-in materials reach a melted or fluid state, the device is ready for use and the turret 21 is turned on post 15 until the compartment having the proper color for the burning-in operation at hand is positioned adjacent the rear side of the post so that its outlet passage 27 is aligned with the post passage 28. Proper operating position of the selected compartment is indicated when the lug 34 corresponding thereto points toward the tool handle, and when this position is reached the ball 31 will move into the indentation 30 for the compartment to releasably hold the passages in registration. After the selected compartment has been properly positioned, the cover member 47 is rotated on the post until either the opening 50 or vent hole 51 is located above the compartment to insure free flow of the material therefrom.

The handle 10 of the device may then be grasped as one would hold a pen or pencil, and the blade is positioned over the gouge or other mar needing repair. By actuating the finger key 44, the valve pin 35 can be raised to permit burning-in material from the rear or selected compartment to flow through passages 27, 28 and 17 to the indentation 18 in the bottom of the blade. When the key 44 is released the action of spring 42 causes the valve pin to be thrust downwardly in the axial post passage 17 and block off the radial passage 28. During this movement of the pin, the lower end thereof shears off a globule of the melted burning-in material and starts it down the axial passage from whence it flows by gravity into the indentation 18. The indentation serves a dual purpose in that it provides a place for the material to go, and its vertical side wall, together with the work surface of the blade, works the material into the gouge and cuts or shears away any excess so that a smooth fill-in results. Thus, as the blade indentation is moved over the gouge, the fluid material flows down into it and is pressed or ironed in by the work surface of the blade with the vertical edge of the indentation aiding in distributing the material, smoothing it and shearing off any excess.

The actual burning-in or ironing-in part of the operation is accomplished by drawing the blade back and forth over the damaged area, and a guide roller 52 carried on arms 54 secured to the shank 12 facilitates the proper drawing motion and insures that the blade will remain flat against the work surface. It will be apparent from the foregoing description that several of the compartments can, if desired, be successively connected with the post passages during a particular mending operation in order to attain a natural grain effect, a mixture of colors or the like. When the device is to be used to perform a burning-in operation on an oblique or vertical surface, no more than five of the six compartments can be filled with burning-in materials. The opening 50 of the cover member is then positioned over the empty compartment so that the remaining five are covered and no material can spill therefrom. In this application of the device, the hole 51 in the cover serves to vent the selected compartment.

The device described hereinabove has utility in performing other than burning-in operations with resinous materials and it is not intended that the invention be limited only to such use. For example, water may be put into the turret compartments, brought to the boiling point and ironed into dents in wood surfaces. The ironing will produce steam which expands the wood fibres and raises the grain to remove the dents. In addition, the central post 15, turret and valve arrangement disclosed herein can be used in an enlarged form as an ingredient measuring and mixing device for producing paints, lacquers or other compositions. To this end, the turret compartments may be filled with the necessary ingredients and controlled amounts thereof selectively delivered through the central post outlet to a mixing vat positioned therebelow.

This invention may be embodied in other specific forms without departing from the spirit or essential characteristics thereof. The embodiments disclosed are therefor to be considered in all respects as illustrative and not restrictive, the scope of the invention being indicated by the appended claims.

What I claim is:

1. In an electrically heated tool having an insulated handle, a work head comprising a knife blade, a hollow post extending through said blade and projecting from the upper side thereof, a turret member rotatably mounted on said post having a plurality of radially disposed compartments adapted to contain heated fluid material to be worked by said blade, each of said compartments having an outlet passage terminating adjacent said post, said post having a radial passage in the wall thereof adjacent said outlet passages, indexing means to selectively bring any one of said outlet passages into registration with said radial passage to permit fluid material to flow through said post to the underside of said blade, a valve element slidable longitudinally in said post and adapted to normally block off said radial passage, and actuating means for said valve element operable from a point adjacent said tool handle.

2. A device as defined in claim 1 wherein the plane of said knife blade is obliquely disposed with respect to the axis of said tool handle.

3. A device as defined in claim 1 wherein the underside of said knife blade is indented in the area adjacent the bottom of said hollow post.

4. A device as defined in claim 1 together with means to releasably hold a selected outlet passage in registration with said radial passage.

5. A device as defined in claim 1 together with a rotatable cover member for said turret member having a single compartment loading opening therein.

6. A device as defined in claim 1 together with a guide roller secured to said work head to insure proper operating position of said knife blade relative to the work.

7. A device as defined in claim 1 wherein said valve actuating means includes an aircooled finger piece adjacent said tool handle.

8. In a mixing device, a vertically supported post having an axial passage therein terminating in an outlet adjacent the lower end of the post, a turret member rotatably mounted on said post having a plurality of radially disposed compartments adapted to contain fluid material, each of said compartments having an outlet passage terminating adjacent the outer surface of said post, said post having a radial passage in communication with said axial passage and terminating adjacent said outlet passages, indexing means to selectively register any one of said outlet passages with said radial passage to permit fluid material from a selected compartment to flow through said post to its outlet, and valve means operable in said axial passage to regulate the flow of material therethrough.

9. A work head for an electrically heated tool comprising a knife blade, a post projecting at substantially right angles from the upper side of said blade, a turret member rotatably mounted on said post having a plurality of compartments adapted to contain fluid material to be worked by the blade, said post having a passage therein communicating with the underside of said blade, each of said compartments having an outlet passage adapted to be selectively connected with said post passage when said turret member is rotated, and valve means to control the flow of fluid material from the connected outlet passage into said post passage.

10. A work head for an electrically heated tool comprising a knife blade, a post projecting at substantially right angles from the upper side of said blade, a turret member rotatably mounted on said post having a plurality of compartments adapted to contain fluid material to be worked by the blade, said post having a passage therein communicating with the underside of said blade, each of said compartments having an outlet passage adapted to be selectively connected with said post passage when said turret member is rotated, and means to releasably hold the connected outlet passage in registration with said post passage.

References Cited in the file of this patent

UNITED STATES PATENTS

| Number | Name | Date |
| --- | --- | --- |
| 650,643 | Hurlimann | May 29, 1900 |
| 1,905,987 | Lane | Apr. 25, 1933 |
| 1,928,576 | Stedley | Sept. 26, 1933 |
| 2,118,415 | Pesark | May 24, 1938 |
| 2,243,400 | Stack | May 27, 1941 |
| 2,300,716 | Vawryk | Nov. 3, 1942 |